J. H. BEAN.
Apparatus for Elevating and Loading Hay.
No. 142,836. Patented September 16, 1873.
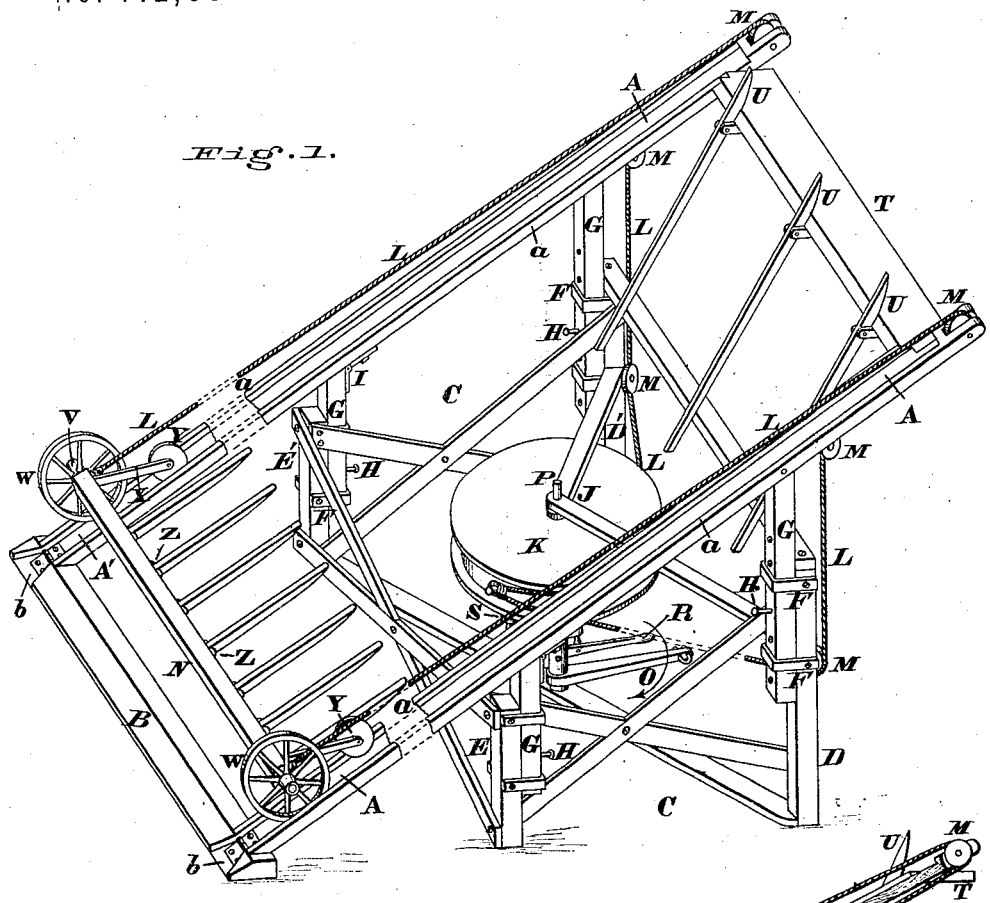
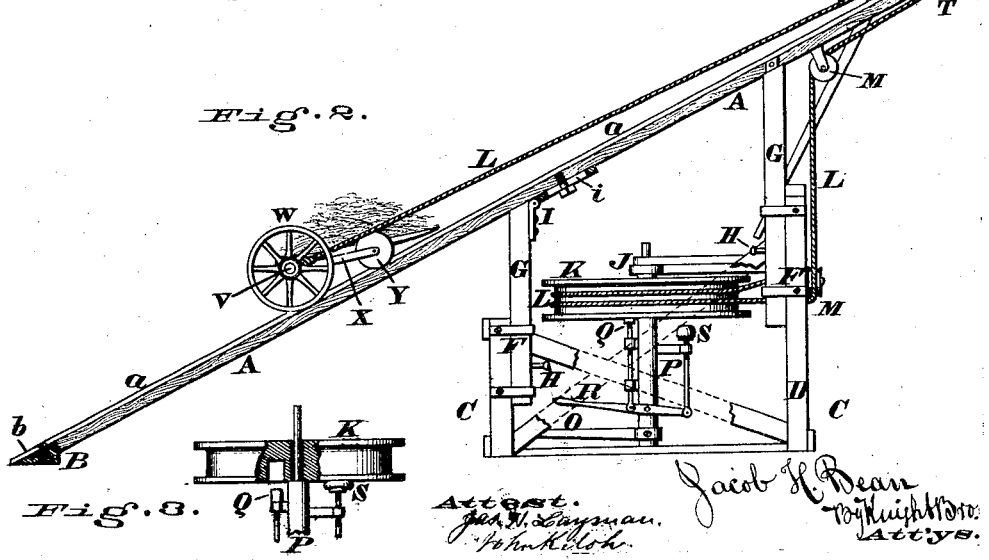

UNITED STATES PATENT OFFICE.

JACOB H. BEAN, OF MACON, ILLINOIS.

IMPROVEMENT IN APPARATUS FOR ELEVATING AND LOADING HAY.

Specification forming part of Letters Patent No. 142,836, dated September 16, 1873; application filed June 18, 1873.

*To all whom it may concern:*

Be it known that I, JACOB H. BEAN, of Macon, Macon county, Illinois, have invented a new and useful Device for Elevating and Loading Hay or Straw, of which the following is a specification:

My invention relates to an acclined track or way, up which a hay-rake, when loaded, may be drawn by means of a suitable drum or windlass, operated by horse or other power, and from which the load is deposited on top of a stack or mow, or into the bed of a wagon, as may be desired.

Figure 1 is a perspective view of my device, the rake being shown empty and part way of the acclined tram-way. Fig. 2 is a longitudinal section of said tram-way, the rake being shown loaded, and a portion of the frame-work or staging broken away; and Fig. 3 represents the brake in action upon the drum or windlass, a portion of the latter being shown in section.

C is a trestle, composed of two rear posts, D D', and two or more intermediate posts, E E'. These posts have loops F to receive and hold legs G, whose upper ends are hinged to the under sides of the tram-rails, the said posts being held to any desired height by means of pins H and the hinges I of the intermediate posts being capable, by means of slots $i$, of slipping up or down along the under sides of the said rails as the latter are depressed or elevated. Beams J, which extend athwart the trestle, support and journal a drum or windlass, K, cords L from which, being rove around the sheaves or pulleys M, are attached to the ends of a rake-head, N.

A sweep, O, which extends from the post P enables the attachment of a horse or other animal of draft.

My drum is not attached permanently to its post P, but is capable of being, at the option of the attendant, made fast thereto by means of a clutch-pin, Q, at the end of a lever, R, whose other extremity is furnished with a brake or rubber, S, so that when the clutch is lowered and the drum released, the brake becomes effective, and operates to instantly arrest the rotation of the drum, and, conversely, the brake is disengaged whenever the clutch is brought into action; or these parts may be put into an intermediate position, so as to have the drum entirely at liberty.

The tram-rails have their upper ends connected by means of a dump-rail or board, T, to whose rear edge are pivoted a number of clearers, U, which yield to the advancing load, but which, on the retrograde movement of the rake, engage behind, and prevent the return of the load, so that when the rake is run back, the load, being no longer supported by the rake, drops down in rear of the elevator. Projecting from the extremities of the rake-head N are gudgeons or axles V for ground-wheels W, by which said head is elevated slightly from the ground. The rake-head has, also, projecting from its front arms X, carrying-wheels Y, also designed to rest upon the ground, and to coact with the wheels W in preventing the fingers or teeth Z from engaging too roughly, so as to become stuck in the ground as the rake is advanced along its surface. The rail-wheels also coact to ease the points or the teeth onto the acclined tram-way, and to relieve the rake to its proper position thereon, the wheels W and Y for this purpose just fitting or occupying the track from curb to curb. The said wheels also operate to hold the rake in a horizontal position upon the tram-way.

In order to enable the teeth to accommodate themselves to inequalities of surface, each one is so united by pivots $z$ to the head as to permit a slight vertical oscillation of any one or more teeth.

The rake having been drawn over the field until a load is collected, is engaged or hitched to the cords, and the windlass, being set in motion, the rake is drawn up the acclined track and its load dumped. The drum being then unclutched, the brake is brought to bear with just sufficient force to permit the empty rake to descend by weight alone, and, having been unhitched from the cords, it is again loaded, elevated, and discharged, as before.

I claim herein as new and of my invention—

1. The acclined and adjustable tram-way A A', a, B C, D D', E E', F G, and H, substantially as and for the purpose described.

2. The automatic dumping devices T U, substantially as described.

3. In this connection, the drum K, clutch Q, and brake R S, all operating as set forth.

4. The acclined tram-ways A A' a, having the described hinged attachments I to posts or legs.

In testimony of which invention I hereunto set my hand.

JACOB H. BEAN.

Witnesses:
GEO. H. KNIGHT,
E. S. WEBB.